United States Patent [19]

Kamil

[11] Patent Number: 4,868,873
[45] Date of Patent: Sep. 19, 1989

[54] PULSE DETECTOR FOR COUNTING DIAL GENERATED PULSES

[75] Inventor: Zvi Kamil, Tel Aviv, Israel

[73] Assignee: Aerotel Israel, Ramat Gan, Israel

[21] Appl. No.: 114,602

[22] Filed: Oct. 30, 1987

[30] Foreign Application Priority Data

Nov. 18, 1986 [IL] Israel .......................................... 80676

[51] Int. Cl.⁴ .............................................. H04Q 1/30
[52] U.S. Cl. .................................... 379/386; 379/372; 379/377
[58] Field of Search ...................... 379/50, 93, 98, 377, 379/372, 27, 31, 105, 286, 386, 351, 350, 104, 339; 375/94, 95, 11, 12, 13; 371/6, 22

[56] References Cited

U.S. PATENT DOCUMENTS

| | | | |
|---|---|---|---|
| 3,879,583 | 4/1975 | Rooks .............................. | 379/286 X |
| 3,927,264 | 12/1975 | Fish et al. ........................... | 379/105 |
| 3,935,392 | 1/1976 | Smith et al. ......................... | 379/386 |
| 4,013,838 | 3/1977 | Tsai ..................................... | 379/104 |
| 4,501,003 | 2/1985 | Miller .................................. | 375/94 |

OTHER PUBLICATIONS

"Dial Pulse Detector", Bringol et al., IBM Technical Disclosure Bulletin, vol. 18, No. 4, Sep. 1975.

*Primary Examiner*—Jin F. Ng
*Assistant Examiner*—Randall S. Vaas
*Attorney, Agent, or Firm*—Sandler & Greenblum

[57] ABSTRACT

A pulse detector system for reliably counting pulse signals generated by calling party telephone dials. The system includes generating a dial pulse template based on a sample train of pulses. A preferred embodiment uses a pulse amplitude template comprising an amplitude histogram.

19 Claims, 4 Drawing Sheets

PULSE DETECTOR FOR COUNTING DIAL GENERATED PULSES

FIELD OF THE INVENTION

This invention is concerned with apparatus and procedures for detecting and reliably counting pulses such as those generated by rotary dials. More particularly the invention is concerned with systems for counting such pulses to generate data for use as input information for computer systems having audio inputs. Such system are especially adaptable for banks and/or other institutions performing computer controlled transactions for a calling party.

BACKGROUND OF THE INVENTION

Telephone dial signals are used to give information and/or instructions to computers. For example, it is known to have calling parties communicate with the bank computer. In greater detail a calling party may want to know the balance in his account at a particular time. He dials the number which causes him to be connected to the bank computer. He then dials an identifying code and a code that will instruct the computer to communicate to him the balance that he has in a particular account. Similiarily, a calling party may telephone signals to instruct a computer of a catalog house or a department store to order material from the catalog according to catalog number.

The dial signals used for such instructions have been double tone, multi-frequency (DTMF) dial signals which provides a generally reliable signal that can be used by telephone circuitry on the receiver side of the phone line circuit. It has been found that rotary dial generated pulses are not reliably detected by telephone circuitry in a "called party" environment.

Systems using DTMF are effective for such applications. However, most of the telephones in the world still use rotary dials and/or electronic pulse systems for signaling rather than the DTMF signals. Therefore, failure of the prior art to provide a reliable system for detecting and counting rotary dial generated pulses for use by computers has inhibited the adaptation of computers systems for telephone transactions by banking and commercial institutions.

Accordingly, it is an object of the present invention to provide techniques and systems to enable pulses (herein after sometimes referred to generically as pulses generated by rotary dials) that are transmitted over telephone lines to be used by computers. The invention thereby enables transactions such as banking transactions to be accomplished with telephones equipped with pulse generators, such as rotary dials. The obstacle to the use of rotary dials for such purpose in the past has been the fact that the rotary dial generated pulses behave as trains of noisy pulses on the receiver side of the called party's line circuit where the computer systems are connected. Thus, pulse operated computer controlled transaction systems in the past have not been able to accurately and reliabily determine the numbers, (information, instructions, etc.) that the calling party customer is sending to the bank or other commercial institutions (the called party).

The most reliable characteristic of the train of rotary dial generated pulses is the time duration of the train. However, even this characteristic is dependent upon the actual dial and the line system between the calling party and the called party. For example every dial generates pulses having slightly different pulse characteristics. Also, there is always cross-talk noises i.e. voice noises on the telephone lines. These noises on the called party side of the line circuit, that is the computer side of the line, can be misinterpreted as pulses and thereby make it impossible for instructions to be sent by the calling party to the computer system. In addition to the other noises the pulse trains generally have what are known as a "tail" at the end of the trains which varies the time length of the pulse train over and above the number of pulses in the train.

Accordingly it is an object of the present invention to overcome these and other difficulties in the use of rotary dials for generating pulses to be used by computer systems for carrying out commercial transactions, for example.

BRIEF DESCRIPTION OF THE INVENTION

In accordance with one broad aspect of the present invention a pulse detector for reliably counting pulses generated by rotary dials is provided, said detector comprises:
- amplifier means for amplifying dial pulse signals received by a line circuit arrangement, said dial pulse signals forming a modulation envelope,
- filter means for filtering said amplified dial pulse signals to limit said envelope to a particular frequency range, envelope detector means for detecting the envelope,
- analog digital converter means for converting the detected envelope to digital signals,
- processing means for reliably counting the pulses generated by a particular dial attached to said line circuit over telephone lines, and
- said processing means including means for providing dial pulse template means for the particular dial based on sample trains of pulse signals generated by the particular dial.

According to a related object of the present invention the sample trains of pulse signals comprises a train of at least one pulse signal and a train of multiple pulse signals.

In accordance with one preferred embodiment, the trains of sample pulse signals are provided by the calling party dialing "0" and "2", for example.

According to a related feature of the present invention, the template is a time template which is indicative of the characteristic time per pulse of the dial.

According to another related feature of the invention means are provided for preventing voice signal noises from being mistakenly counted as pulses. More particularly an "amplitude" template is provided. The "amplitude" template is generated by a distance histogram made of different measured distances between extremes on the amplitude versus time characteristic of the sample trains of pulses. The template provides the histogram count per pulse. The template provides a number distance combination which could not be generated by voice signal noises.

According to yet another feature of the invention the system is inhibited after the incoming pulse train signals are detected and the number of pulses counted and verified. The system inhibits itself for a set period of time; after which, an audible signal is transmitted to the calling party notifying the calling party that his previous instruction was accepted and he can now dial the next instruction. The inhibit system is designed to inhibit interdigital noise from falsely triggering the system and providing erroneous instructions. The set period of time is equal to what is known in the art as an "interdigital interval".

BRIEF DESCRIPTION OF THE DRAWINGS

The above named and other features and objects of the present invention will be best understood by referring to the following description of a broad aspect of the present invention in conjunction with the accompanying drawings, wherein.

GENERAL DESCRIPTION

Figure 1:
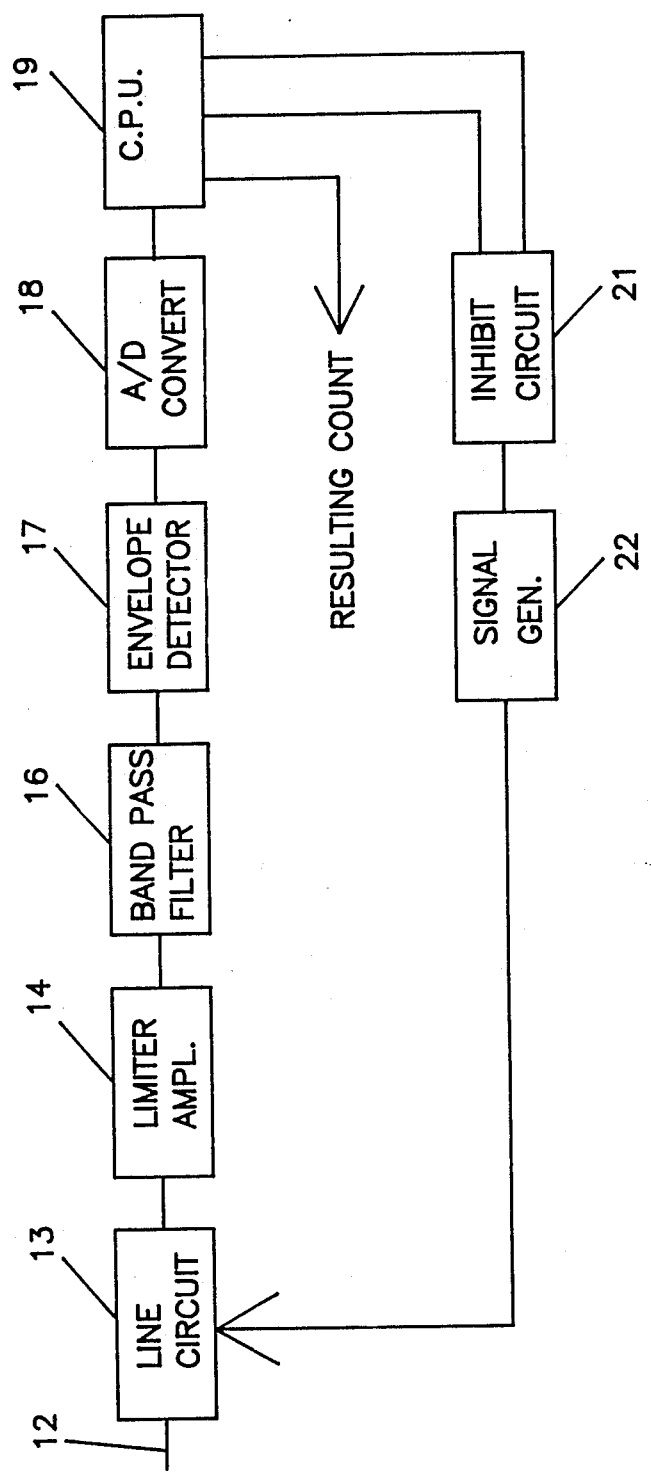
FIG. 1 is a block diagram of the pulse detector for counting pulses generated by rotary dials.

The pulse detector system 11 shown in FIG. 1 indicates that the signals are coming over a telephone line 12. The telephone line 12 is connected to a telephone line circuit shown as 13. The detector system 11 is connected to the receiver end of the line circuit 13. A limiter amplifier 14, amplifies the incoming pulses generated by the rotary dial for example. Subsequent to the limiter amplifier, the amplified dial pulse signals are filtered by a band pass filter 16. In a preferred embodiment the pass band of the filter extends from power line frequency to 300 Hertz.

The amplified filtered signals are in the form of a modulation envelope. An envelope detector 17 is used to obtain the envelope shape. The output of the envelope detector, that is the detected envelope is then converted to digital signals by analog to digital converter (ADC) 18.

The output of the ADC unit is then sent to a processor 19 for assuring that only dial pulses are being counted and that the count is reliable. The resulting number obtained from counting the dial pulses is one of the outputs of the processor. The processor 19 also sends out various control and timing signals not shown. One of the control signals operates an inhibit circuit 21 that inhibits the system after the number of dial pulses is obtained and verified. In one preferred embodiment the inhibit circuit operates for an interdigital time of 700 m.s. At the end of the inhibit period an audio signal is sent by audio signal generator circuit 22 to the calling party; notifying the calling party that the instruction has been received and verified and that he may now send his next instruction.

According to a preferred embodiment, the invention overcomes the shortcomings of the prior art by providing template means based on the particular characteristics of the calling party's dial and line over which the information; i.e.; dial pulse trains are sent. After being connected to the line circuit, the calling party, in a preferred embodiment, sends two sample trains of pulses. By way of example, to generate a first train of ten pulses, he dials "0" and as a second sample train of pulses, he transmits 2 pulses by dialing "2".

Figure 2:
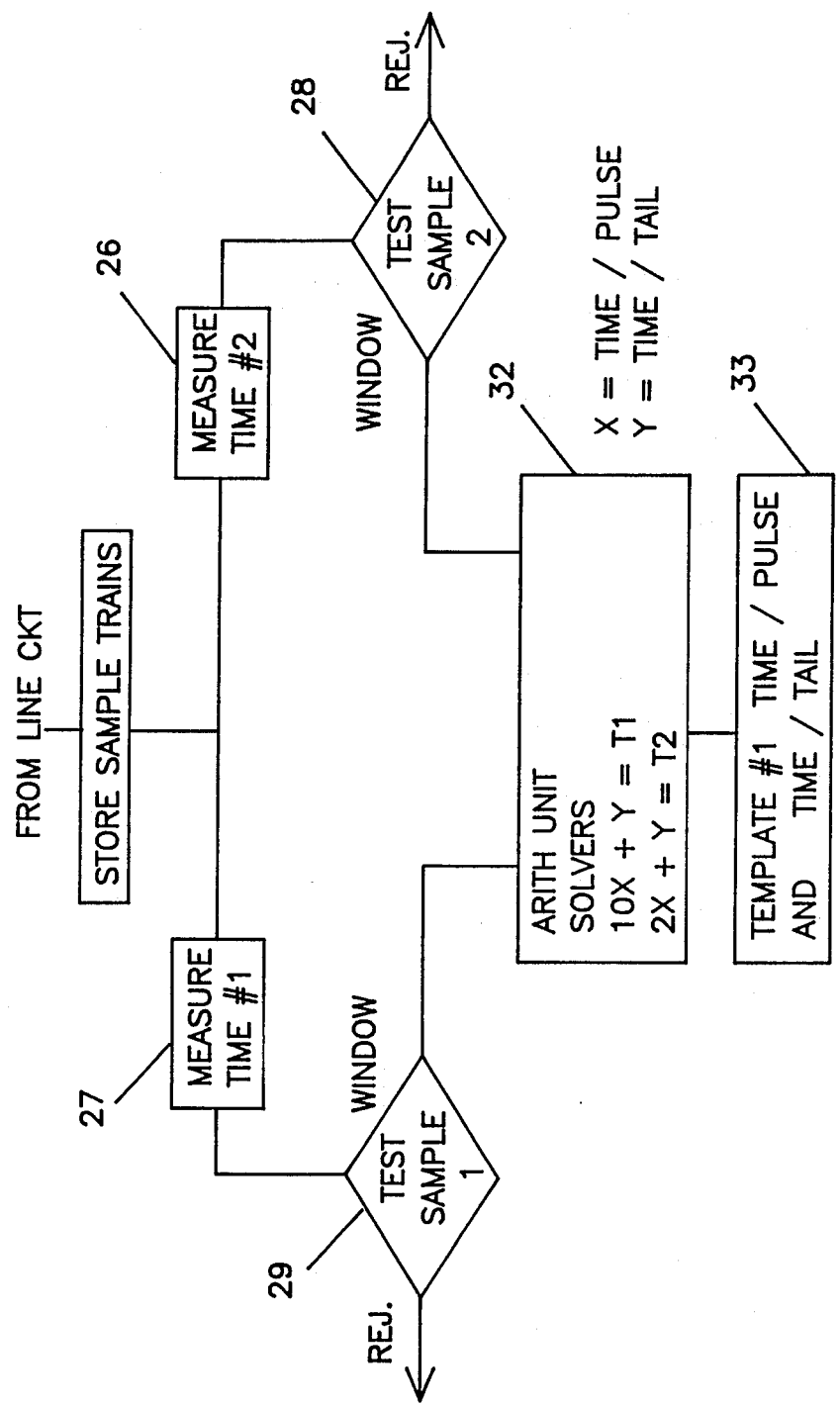
FIG. 2 is a flow chart showing the steps in generating a time template.

The flow diagram of FIG. 2 indicates that the system stores the sample trains at block 26. The sample trains are then measured to determine the time lengths of the trains-as indicated by blocks 27 and 28. The sample trains are tested according to their time duration as indicated by blocks 29 and 31. The sample train of ten pulses in a preferred embodiment must have a time length between 800 and 1300 milliseconds for example, the sample train of two pulses must have a time length between 140 and 260 ms or they are rejected. If they are rejected the audio signal is not transmitted. The calling party redials if there is an absence of an audio signal.

The time template is prepared assuming that there are two unknowns. They are the actual time length per pulse plus the length of the tail that follows each pulse train. The two sample trains enables using two linear equations. Therefore it is easy to solve the set of linear equation, to obtain the time length per pulse and the time length per tail as indicated by block 32. The equations for the example of 10 pulses and 2 pulses are;

$$10X + Y = T1$$

$$2X + Y = T2$$

where:
X = time per pulse,
Y = time per tail,
T1 = time duration of the 10 pulses, and
T2 = time duration of the 2 pulses.

Solving the equations for the time/pulse and the time of the tail enable the construction of a time template or template No. 1 as indicated at block 33.

Figure 3:
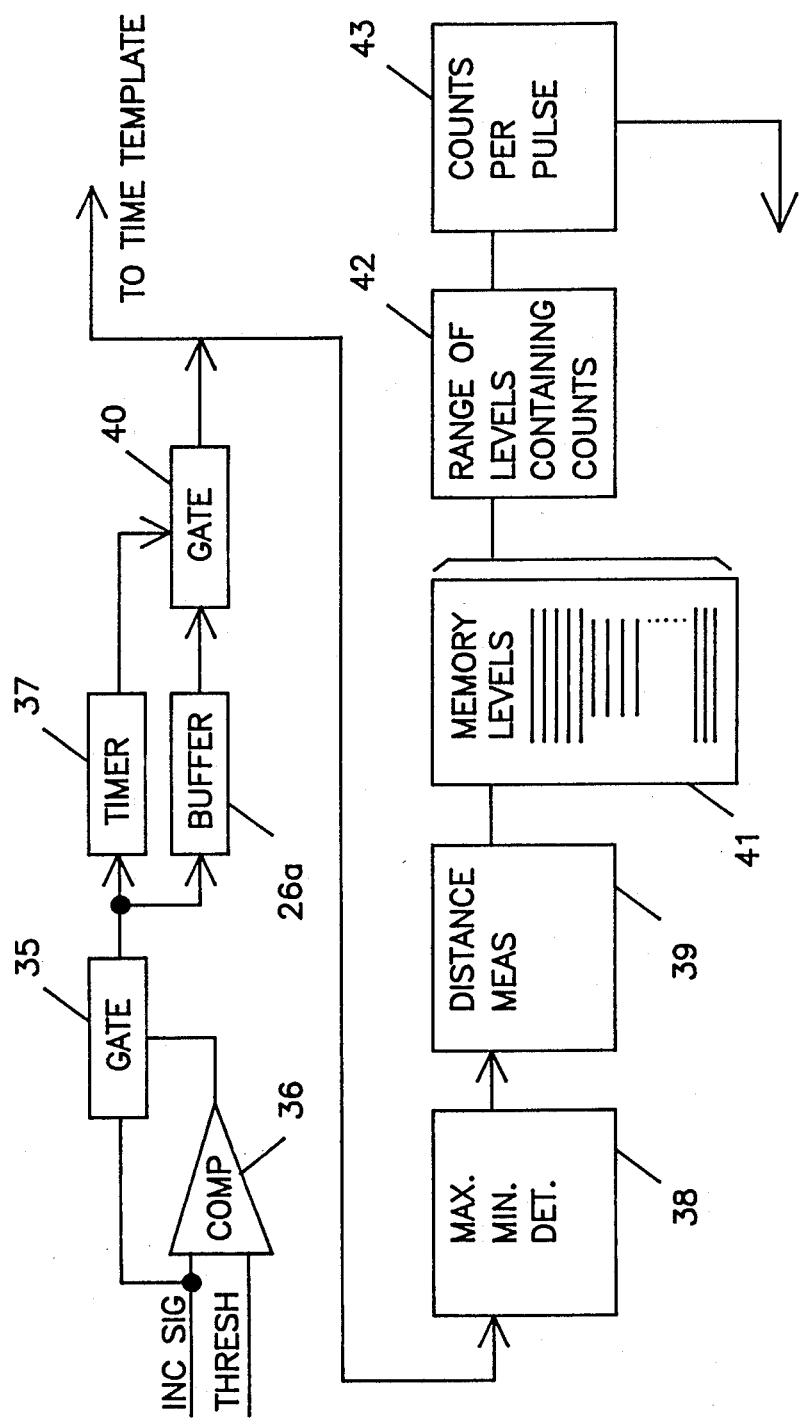
FIG. 3 is a block diagram showing the generation of an amplitude or distance template.

The block diagram of FIG. 3 shows the construction of an "amplitude" template or template No. 2. Template No. 2 provides means for preventing voice signals from falsely triggering the pulse detector system.

The signals generated by dialing "0" and "2" are first compared in comparator gate 36 to a certain threshold to ascertain that they are of a minimum amplitude to remove noise signals. The output of the comparator gate are input pulse train signals of a certain minimum amplitude which are stored in a buffer memory 26a. In a preferred embodiment, the minimum amplitude is 120 mv volts. The input signals from the comparator are used to operate a timing gate 37 which indicates the beginning and end of the pulse trains. The end of the pulse train is determined by an absence of pulses for a time period of at least 140 ms.

The pulses are then examined to determine points of changes in directions or minima and maxima on the amplitude versus time characteristic as indicated by block 38. The distances between the points of changes in direction is determined as indicated at block 39. The distances are digitized and stored in digital store 41 in accordance to the digital value of the distance. The store for example have 256 levels. The distances are digitized into values between 1 and 256 so that the measured distances are stored in levels corresponding to the digital value of the distance. In this manner the digital store or memory is effectively the template.

The sample pulse trains enable determining how many pulses there are per determined distance or counted distances. In the preferred embodiment an ideal pulse train of ten pulses produces 40 distances since there is a maxima and a minima at the beginning and at the end of each individual pulse. After the first sample pulse train the memory 41 is examined to determine which levels of the memory hold the 40 counts, i.e. the largest distances. This determines the range of levels holding the counts as indicated by block 42. After the sample two pulse train the same range of levels is checked to see how many counts are stored. There should be approximately 8 counts usually between 6 and 10 counts. A determination is then made of the counts per pulse. The determination is as follows, 43 counts and 10 counts (for example) for 10 pulses and 2 pulses gives 33/8 or 4.125 counts per pulse. (As indicated at block 43)

The second template is used as a final test for the time template determined number of pulses. Thus, if the time template determined number of pulses is 5 than according to the previous example, 15 to 25 histogram counts should be found in the pertinent range of levels of the memory 41. If there are approximately 20 counts (20=5) in the pertinent range then the count is verified and accepted, otherwise it is rejected. Note that once the distance template is set, the ranges of levels and the counts per pulse are noted. The memory is then erased. The next train of incoming pulses are stored in the memory. A count of the pertinent range gives a number that when divided by the counts per pulse gives the number of pulses.

Figure 4:
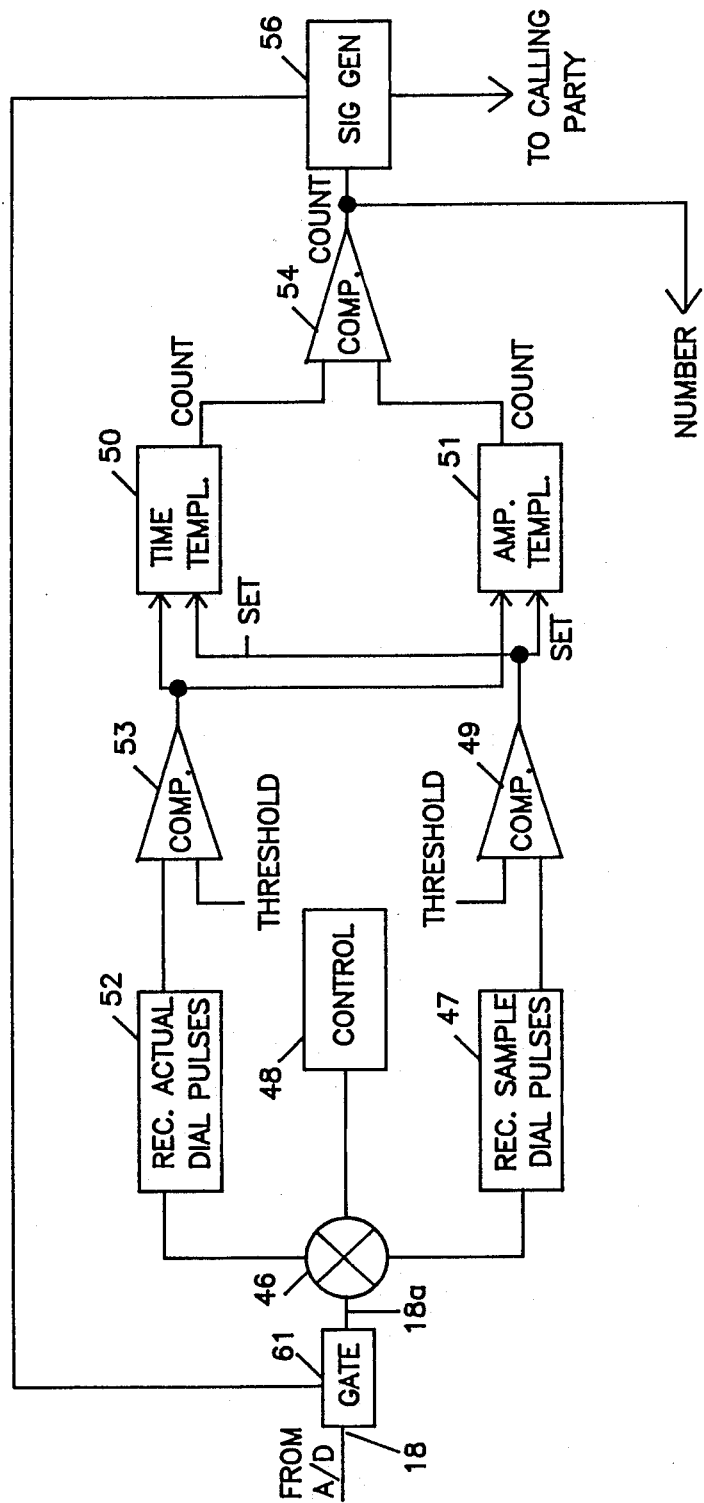
FIG. 4 is a block diagram showing the use of the templates for distinguishing and counting pulses received from the calling party.

The templates are used in one embodiment as shown in FIG. 4. It should be realized that the embodiments described can be implemented by either hardware or software. In FIG. 4 the signal from the analog digital converter is shown on line 18a connected to a switch 46 of the processor. When the templates are being made, the "0" and "2" pulse trains are sent to a receive sample digit circuit 47.

The switch is operated by control signals indicated at 48. The control signals are generated in the processor 19, in a preferred embodiment. The received sample pulse trains are sent through threshold comparator gate 49 to both the time template 50 and the amplitude or distance template 51. The threshold comparator gate assures that the incoming pulse is over a certain minimum value. The set time template 50 determines the time per pulse based upon the characteristics of the particular rotary dial of the calling party and the connections between the calling and the called party. The amplitude template 51 determines the amplitude histogram which determines the actual number of histogram counts per pulse, thereby, overcoming pulse count discrepancies due to various and sundry voice noises such as caused by talk, announcement systems, etc.

Once the templates are set then the switch 46 sends subsequent pulse signals to the receive signal pulse circuit 52. From there the received pulses are sent through threshold gate 53 to the set time template and to the set amplitude template for determining the pulse train time length and for determining the distance values. The time and the distance are processed with the templates to determine the number of pulses. The number of pulses determined by the time template and the distance template are compared in compare circuit 54. If the comparisons are favorable, that is if the time template derived number of pulses agree with the amplitude template derived number of pulses (plus or minus the tolerance), the count is determined and an operate signal is sent to an interdigital audio signal generator 56. Responsive to the operate signal, generator 56 sends an audio signal to the calling party and an operating signal to close gate 61 at the input to switch 46. The gate 61 prevents any interdigital voice signals or noises from being misinterpreted as pulse trains during the interdigital time. The audio signal is sent to the calling party during the inhibit time. Subsequently either another pulse train will be sent or the call will be terminated if the calling party's business is finished.

Once the template is made, the calling party merely has to send further dial pulse information without any further calibration.

The computer responds to the information. Assume, for example, that the information is to a bank and asks for the balance of a certain account. After proper verifications of the code number etc. are made, an audio signal will tell the party the balance of his particular bank account or verify that so much money has been transferred from one account to another account.

In operation, the construction of the templates overcomes serious problems that have prevented the use of rotary dial pulses as computer input data. While the time template may be sufficient in certain instances, almost absolute reliability is obtained through the use of the time template and the amplitude histogram template which are constructed based on sample pulse trains generated by the calling party.

While the invention has been described with regard to exemplary embodiments, it should be understood that this description is by way of example only and not as a limitation on the scope of the invention.

What is claimed is:

1. A dial pulse detector system at a called party's telephone line circuit for reliably counting dial pulse signals generated by a connected calling party's telephone dial, said detector system comprising:
    amplifier means for amplifying said dial pulse signals to provide amplified dial pulse signals at said amplified called party's line circuit, said dial pulse signals forming a modulation envelope of amplified dial pulse signals,
    filter means for filtering said amplified dial pulse signals to limit said envelope to a particular frequency range,
    envelope detector means for detecting the limited envelope,
    analog to digital converter means for converting the detected envelope to digital signals,
    processing means at the called party's line circuit for reliably counting the number of dial pulses generated by the dial at the calling party's line circuit that is attached to said called party's line circuit over telephone lines, and
    said processing means including means for providing dial pulse template means to determine dial pulse time and amplitude characteristics for the dial at the calling party's line circuit based on sample trains of dial pulse signals generated by the dial at the calling party's line circuit.

2. The pulse detector system of claim 1 wherein said means for providing template means includes means for providing a time template for determining the number of pulses as a function of the time used by said sample trains of pulse signals.

3. The pulse detector system of claim 1 wherein said means for providing template means include means for providing an amplitude template for determining the number of dial pulses as a function of an amplitude characteristic of the pulses in said sample trains of dial pulse signals.

4. The pulse detector system of claim 2 wherein said means for providing a time template includes means for determining the time per pulse from the sample trains of dial pulse signals.

5. The pulse detector system of claim 1 wherein means are provided for testing the time lengths of the sample trains of dial pulse signals.

6. The pulse detector system of claim 3 wherein said amplitude characteristic comprises the vertical distance between changes of direction of the amplitude versus time graph of the sample trains of dial pulse signals.

7. A detector system for reliably determining a number of pulses generated by a calling telephone dial where the determined number is used as an input to a computer connected to a called telephone, said detector system comprising:
   means for connecting said detector system to the receiver side of the line circuit of said called telephone, and
   means for providing dial pulse template means of time and amplitude characteristics for said calling telephone dial, the lines and connections between the calling telephone dial and the detector system at the called telephone from sample trains of pulses generated by the calling telephone dial.

8. A pulse detector method for reliably counting dial pulse signals received at a called party's line circuit and generated by a dial in a calling party's telephone line circuit, said dial pulse detector method comprising the steps of:
   amplifying said dial pulse signals to provide amplified dial pulse signals, said amplified dial pulse signals forming a modulation envelope of dial pulse signals,
   filtering said amplified dial pulse signals to limit said envelope to a particular frequency range,
   detecting the limited envelope,
   converting the detected envelope to digital signals,
   counting the digital signals to obtain the number of signals generated by the calling party's telephone dial, and
   said counting step including the step of providing a dial pulse template showing dial pulse characteristics for the calling party's telephone dial based on at least a sample train of dial pulse signals generated at the calling party's telephone dial and using the template for distinguishing dial pulses from noise.

9. The pulse detector method of claim 8 wherein said step of providing template means includes the step of providing a time template for determining the number of pulses as a function of the time used by said at least a sample train of dial pulse signals.

10. The pulse detector method of claims 8 wherein said step of providing template means include providing an amplitude template for determining the number of pulses as a function of an amplitude characteristic of the pulses in said at least a sample train of dial signals.

11. The pulse detector method of claims 9 wherein said step of providing a time template includes determining the time per pulse from the said at least a sample train of pulse signals.

12. The pulse detector method of claims 8 including the step of testing the time lengths of at least two sample trains of dial pulse signals.

13. The pulse detector method of claim 12 wherein said amplitude characteristic comprises the distance between changes of direction of the amplitude versus time graph of the sample trains of dial pulse signals.

14. A dial pulse detector system at a called party's telephone line circuit for reliably counting dial pulse signals generated by a telephone dial at a calling party's line circuit, said calling party's line circuit being connected to said called party's line circuit, said detector system comprising:
   (a) amplifier means for amplifying said dial pulse signals to provide amplified dial pulse signals, said amplified dial pulse signals forming a modulation envelope of amplified dial pulse signals;
   (b) filter means for filtering said amplified dial pulse signals to limit said envelope to a particular frequency range;
   (c) envelope detector means for detecting the limited envelope;
   (d) analog to digital converter means for converting the detected envelope to digital signals;
   (e) processing means at the called party's line circuit for processing the digital signals to reliably count the number of dial pulses generated by the dial at the calling party's line circuit when said calling party's line circuit is connected to the called party's line circuit over telephone lines;
   (f) said processing means including means for providing dial pulse template means for the calling party's telephone dial based on two sample trains of dial pulse signals generated by the calling party's telephone dial;
   (g) said template means including means for providing an amplitude template for determining the number of dial pulses as a function of an amplitude characteristic of the dial pulses in said sample trains of dial pulse signals; and
   (h) said amplitude characteristic comprising the vertical distance between maxima and minima of an amplitude versus time graph of the sample trains of dial pulse signals.

15. The pulse detector system of claim 14 wherein said amplitude template comprises a histogram template of distances wherein means are provided for arranging the distances in levels, and means for determining ranges of levels for holding distance counts obtained from the sample trains of dial pulse signals and the number of distance counts per pulse whereby the number of pulses in a determined range is ascertained by dividing the number of counts in the determined range by the number of counts per pulse.

16. The pulse detector system of claim 15 and means for determining the number of pulses in a transmitted train of pulse signals with said time template and means for checking to ascertain the validity of the number of pulses determined with said time template with said distance histogram template.

17. A pulse detector method for reliably counting dial pulse signals received at a called party's line circuit and generated at a calling party's telephone dial, said method comprising the steps of:
   (a) amplifying the received dial pulse signals;
   (b) said amplified dial pulse signals forming a modulation envelope of signals;
   (c) filtering said amplified dial pulse signals to limit said envelope to a particular frequency range;
   (d) detecting the limited envelope, converting the detected envelope to digital signals;
   (e) counting the number of digital signals generated by the calling party's telephone dial;
   (f) said counting step including the step of providing dial pulse amplitude and time template means for the calling party telephone dial based on amplitude characteristics and time lengths of at least two sample trains of dial pulse signals generated at the calling party's telephone dial and received at the called party's line circuit; and (g) said amplitude characteristics comprising the distances between maxima and minima of the amplitude versus time graph of the two sample trains of dial pulse signals.

18. The pulse detector method of claims 17 wherein said amplitude template comprises a histogram of distances and including the steps of: placing the distances in a plurality of memory levels and determining the count of the number of distances in said levels to provide the counts per pulse from the sample trains of dial pulse signals.

19. The pulse detector method of claim 18 including the step of determining the number of pulses in a transmitted train of dial pulse signals with said time template and checking to ascertain the validity of the number of pulses determined with said time template with said amplitude template. said amplitude template.

* * * * *